(12) United States Patent
Klingels

(10) Patent No.: US 11,904,272 B2
(45) Date of Patent: Feb. 20, 2024

(54) REDUCING CONTRAILS DURING OPERATION OF AIRCRAFT

(71) Applicant: MTU Aero Engines AG, Munich (DE)

(72) Inventor: Hermann Klingels, Dachau (DE)

(73) Assignee: MTU Aero Engines AG, Munich (DE)

(*) Notice: Subject to any disclaimer, the term of this patent is extended or adjusted under 35 U.S.C. 154(b) by 656 days.

(21) Appl. No.: 16/977,181

(22) PCT Filed: Feb. 27, 2019

(86) PCT No.: PCT/DE2019/000048
§ 371 (c)(1),
(2) Date: Sep. 1, 2020

(87) PCT Pub. No.: WO2019/166040
PCT Pub. Date: Sep. 6, 2019

(65) Prior Publication Data
US 2021/0001269 A1   Jan. 7, 2021

(30) Foreign Application Priority Data
Mar. 2, 2018 (DE) .......................... 102018203159.2

(51) Int. Cl.
*B01D 53/26* (2006.01)
*B01D 5/00* (2006.01)
(Continued)

(52) U.S. Cl.
CPC ........... *B01D 53/265* (2013.01); *B01D 5/009* (2013.01); *B01D 5/0027* (2013.01);
(Continued)

(58) Field of Classification Search
CPC .. B01D 53/265; B01D 5/0027; B01D 5/0051; B01D 5/0081; B01D 5/0084;
(Continued)

(56) References Cited

U.S. PATENT DOCUMENTS

| | | | | |
|---|---|---|---|---|
| 1,924,122 A | * | 8/1933 | Jones | ..................... B64D 15/04 244/134 B |
| 2,447,486 A | * | 8/1948 | Burke, Jr. | ................. F01N 3/05 60/309 |

(Continued)

FOREIGN PATENT DOCUMENTS

| | | |
|---|---|---|
| DE | 69802083 T2 | 9/2002 |
| DE | 10216710 B4 | 11/2006 |

(Continued)

OTHER PUBLICATIONS

See Search Report of PCT/DE2019/000048 dated Jun. 26, 2019.

*Primary Examiner* — Audrey B. Walter
(74) *Attorney, Agent, or Firm* — Davidson, Davidson & Kappel, LLC

(57) ABSTRACT

A method is described for reducing contrails during operation of an aircraft (100, 100') having a heat engine 10. The method includes inducing a condensation of moisture contained in the exhaust gas (A) of the heat engine by mixing at least a portion of the exhaust gas with ambient air (U) of the aircraft as well as separating the condensed-out water on the aircraft. Also described is an aircraft (100, 100') having a heat engine (10). The aircraft includes at least one nozzle (30) which is adapted for conducting exhaust gas (A) from the heat engine of the aircraft at least partially into ambient air (U) of the aircraft and thus to produce a gas mixture, and at least one separator device (40) for separating condensed-out water from the gas mixture.

9 Claims, 2 Drawing Sheets

(51) Int. Cl.
  *B01D 53/24*  (2006.01)
  *B01D 53/32*  (2006.01)
  *F02K 1/46*   (2006.01)
  *F01D 25/32*  (2006.01)
  *B64D 33/04*  (2006.01)

(52) U.S. Cl.
  CPC ......... *B01D 5/0051* (2013.01); *B01D 5/0081* (2013.01); *B01D 5/0084* (2013.01); *B01D 53/24* (2013.01); *B01D 53/323* (2013.01); *F01D 25/32* (2013.01); *F02K 1/46* (2013.01); *B01D 2258/01* (2013.01); *B01D 2259/4575* (2013.01); *B01D 2259/818* (2013.01); *B64D 33/04* (2013.01); *F05D 2260/213* (2013.01)

(58) Field of Classification Search
  CPC ...... B01D 5/009; B01D 53/24; B01D 53/323; B01D 2258/01; B01D 2259/4575; B01D 2259/818; F01D 25/32; F02K 1/46; B64D 33/04; F05D 2260/213
  See application file for complete search history.

(56) References Cited

U.S. PATENT DOCUMENTS

| | | |
|---|---|---|
| 3,978,661 A | 9/1976 | Cheng et al. |
| 4,066,214 A | 1/1978 | Johnson et al. |
| 6,016,651 A | 1/2000 | Hammond et al. |
| 6,122,907 A | 9/2000 | Frawley et al. |
| 7,208,239 B2 | 4/2007 | Hoffjann et al. |
| 7,767,359 B2 | 8/2010 | Hoffjann et al. |
| 7,971,438 B2 | 7/2011 | Taylor et al. |
| 2008/0072577 A1 | 3/2008 | Taylor et al. |
| 2013/0206912 A1* | 8/2013 | Bright ............... B64D 1/18 62/601 |
| 2015/0285158 A1 | 10/2015 | Hillel et al. |
| 2017/0290935 A1* | 10/2017 | Boodaghians ........... A47L 9/02 |

FOREIGN PATENT DOCUMENTS

| | | |
|---|---|---|
| EP | 3048281 A1 | 7/2016 |
| GB | 596696 A | 1/1948 |
| GB | 2531629 A | 4/2016 |
| GB | 2531632 A | 4/2016 |
| WO | WO2008145953 A2 | 12/2008 |

* cited by examiner

REDUCING CONTRAILS DURING OPERATION OF AIRCRAFT

The present invention relates to a method for reducing contrails during operation of aircraft having heat engines. The present invention also relates to an aircraft having a heat engine.

BACKGROUND

Many aircraft are propelled by heat engines in combination with suitable propulsion generators (propulsors). As propulsion generators, propellers and blowers (also referred to as "fans") are used; moreover, the exhaust-gas jet from the heat engine also contributes to the propulsion.

The most commonly used heat engines are gas turbines and piston engines (reciprocating pistons, rotary pistons), the latter only being used today for relatively small aircraft.

Presently, fossil fuels are almost exclusively used as sources of energy. Attempts have also been made with liquid hydrogen or liquid natural gas. Combusting these fuels results in undesirable environmental impacts that contribute to climate change.

Combusting fossil fuels mainly produces carbon dioxide ($CO_2$) and water ($H_2O$); however, nitrogen oxides ($NO_x$), sulfur oxides ($SO_x$), unburned hydrocarbons ($C_xH_y$), carbon monoxide (CO) etc., can also be additionally found in the exhaust gas. When hydrogen is used, mainly water and, due to the high process temperatures, also nitrogen oxides ($NO_x$) are produced.

Under certain conditions, the water present in the exhaust gas produces contrails. They are formed when the warm, moist exhaust gas mixes with colder ambient air.

There are contentious discussions among experts about the effect of contrails and of the resulting cirrus clouds on global climate change. Many are of the opinion that the effect of contrails is of similar—if not greater importance—than $CO_2$ emissions from aircraft and that contrails thus account for a significant proportion of the climate impact of all air traffic.

To dehumidify exhaust-gas flows from a gas turbine engine, U.S. Pat. No. 7,971,438 B2 describes a system of a plurality of heat exchangers (recuperators), which are used to at least partially condense out water vapor present in the exhaust gas.

The recuperators are thereby purely gas/gas heat exchangers. Since they are to operate at low pressure and also at small temperature differences, they must have a large volume. For that reason, the usable heat exchangers are heavy and, moreover, cause substantial pressure losses. This, in fact, increases the fuel consumption of the aircraft.

SUMMARY OF THE INVENTION

It is a technical object of the present invention to provide a method which makes possible a reduction in the formation of contrails during operation of aircraft while avoiding the described disadvantages.

The present invention provides a method to reduce contrails during operation of aircraft having heat engines. It includes inducing a condensation of moisture contained in the exhaust gas of the heat engine by mixing at least a portion of the exhaust gas with ambient air of the aircraft (thus, which at least partially flows around the aircraft, respectively along a surface thereof). The water, which has been condensed out, is separated on the aircraft, for example, on an outer surface or at least partially within a cavity thereof.

An aircraft according to the present invention includes a heat engine and at least one nozzle that is adapted for introducing exhaust gas, which is produced during operation of the aircraft from the heat engine, at least partially into ambient air of the aircraft and to thereby form a gas mixture; the at least one nozzle (which, in particular may be a core engine nozzle) is preferably at least partially circumflowed by the ambient air during operation of the aircraft and/or adapted for discharging the exhaust gas in the direction of flow of the ambient air. An aircraft according to the present invention also has a separator device for separating condensed-out water from the gas mixture. In particular, the aircraft is suited for implementing a method according to the present invention in accordance with one of the specific embodiments described in this document.

The inventive mixing of the exhaust gas with the ambient air (which has a lower temperature than the exhaust gas) makes possible an effective cooling of the exhaust gas using the simplest means, in particular without large or heavy heat exchangers having to be integrated into the aircraft and carried along therewith. The moisture contained in the exhaust gas may be cooled in this manner to below the dew point at which the relative humidity is 100%, and thus saturation is reached; below the dew point, microscopically small water droplets form on condensation nuclei (for example, on dust, soot particles and/or electrically charged molecules).

The separated, condensed-out water is preferably collected via a collecting channel of the aircraft, for example. From there, the water is able to be drawn off by a condensate pump. At least a portion of the water may then be allowed to drain overboard directly through a discharge conduit, and/or at least a portion of the water may be fed to a water treatment and, subsequently thereto, to the heat engine; in the latter case, for example, the water may be at least partially injected into the combustion chamber and/or at least partially fed to a steam generator that may be adapted to generate steam from the water utilizing waste gas heat. Accordingly, an aircraft according to the present invention may include a collecting channel, which is conceived for the mentioned functions, a condensate pump, a discharge conduit, a device for water treatment and/or a steam generator.

The mixing may be at least partially performed on an outer surface of the aircraft (in particular in a (fluid-dynamic) boundary layer forming thereon), along which at least a portion of the ambient air flows. The surface may be disposed on the fuselage, on a wing, a tail unit or on an engine nacelle of the aircraft, for example.

A surface of this kind may be disposed behind the heat engine in relation to a specified direction of flight, so that, following the outflow thereof from the heat engine, the exhaust gas flows directly onto the surface.

In accordance with an advantageous specific embodiment of a method according to the present invention, at least a portion of the exhaust gas may be alternatively or additionally conducted through a conduit system to such a surface over which ambient air flows; in this way, a surface structure may be utilized, which is particularly advantageous for mixing and/or separation and/or possibly collection, for example.

Such a conduit system preferably leads to a nozzle (for example, a core engine nozzle) through which the exhaust gas (respectively, a portion thereof) may be discharged for mixing (preferably in the direction of flow of the ambient air); the nozzle is preferably configured to be at least partially circumflowed by the ambient air during operation. Accordingly, an aircraft according to the present invention may include such a conduit system, at whose end, the at least one nozzle may be located.

The exhaust gas may be conducted namely by such a conduit system, for example, to a plurality of different locations (for example, on the fuselage and on at least one of the wings, or on the top and bottom side of at least one wing) on the aircraft and thus widely distributed, making it possible to achieve an especially advantageous mixing ratio that includes a large proportion of cool ambient air and a relatively small proportion of hot exhaust gas.

An advantageous specific embodiment of a method according to the present invention provides that the mixing be at least partially performed in a mixing channel formed in the aircraft that is traversed by the flow of at least a portion of the ambient air; accordingly, an aircraft according to the present invention may have such a mixing channel therefor, in which the at least one nozzle may be disposed and/or into which it may be directed.

Such a mixing channel may feature a variable inlet opening for adjusting an inflow of ambient air. Accordingly, a method according to the present invention may include adjusting the inflow by controlling such a variable inlet opening, for example, as a function of a respective current output power of the heat engine and/or of a temperature of the ambient air. This makes it possible to achieve a mixing ratio that is beneficial for the condensation, while avoiding a substantial flow which hinders separation and/or collection of the separated water. An aircraft according to the present invention may include a corresponding actuation and control unit for adjusting such a variable inlet opening.

The exhaust gas (respectively, a portion thereof) may be fed from the engine to the mixing channel by a conduit system; accordingly, an aircraft according to the present invention may include such a conduit system.

Separating the condensed-out water may include centrifugal separation and/or centrifuging out at least a portion of the condensed-out water droplets, it being possible in each case for the exhaust gas and/or the gas mixture to be set in rotation; accordingly, an aircraft according to the present invention may have at least one device for centrifugal separation and/or for centrifuging out at least a portion of the condensed-out water.

In accordance with an advantageous specific embodiment of a method according to the present invention, the separation of the condensed-out water includes an electrostatic charging of water molecules in the exhaust gas and directing at least some of the charged, condensed-out water droplets towards a pole, which is complementary (to the charging) (and thus preferably functions as a precipitation electrode). The charging may be effected, for example, by a spray electrode for impact ionization, respectively for implementing a corona charging. In this manner, the electrostatic forces are able to suitably direct the water droplets formed and thus facilitate removal of the water, for example, via a collecting channel from where the water may be drawn off, as mentioned above. In variants where mixing is performed at least partially on an outer surface of the aircraft, as described above, at least one region of this surface may be in the form of a precipitation electrode (thus, suitably electrically charged); the water droplets may thereby be induced to move toward the surface.

Accordingly, an aircraft according to the present invention may preferably have a device having a first pole for electrostatically charging water molecules in the exhaust gas and a second pole (complementary to the first) (for example, a precipitation electrode) for attracting at least a portion of the charged, condensed-out water droplets. The first pole may be in the form of a spray electrode for impact ionization, respectively for implementing a corona charging, for example. An advantageous variant provides that the first pole be disposed inside of the at least one nozzle. However, it may also be disposed downstream thereof.

In variants where the at least one nozzle is directed at an outer surface over which at least a portion of the ambient air flows during operation of the aircraft; at least one region of this surface may form the second pole (the precipitation electrode) analogously to the above.

BRIEF DESCRIPTION OF THE DRAWINGS

Preferred exemplary embodiments of the present invention will be described in greater detail below with reference to the drawing. It is understood that individual elements and components may be combined differently than described. Reference numerals for mutually corresponding elements are used for both figures and, as the case may be, are not respecified for each figure.

In the schematic drawing.

DETAILED DESCRIPTION

Figure 1:
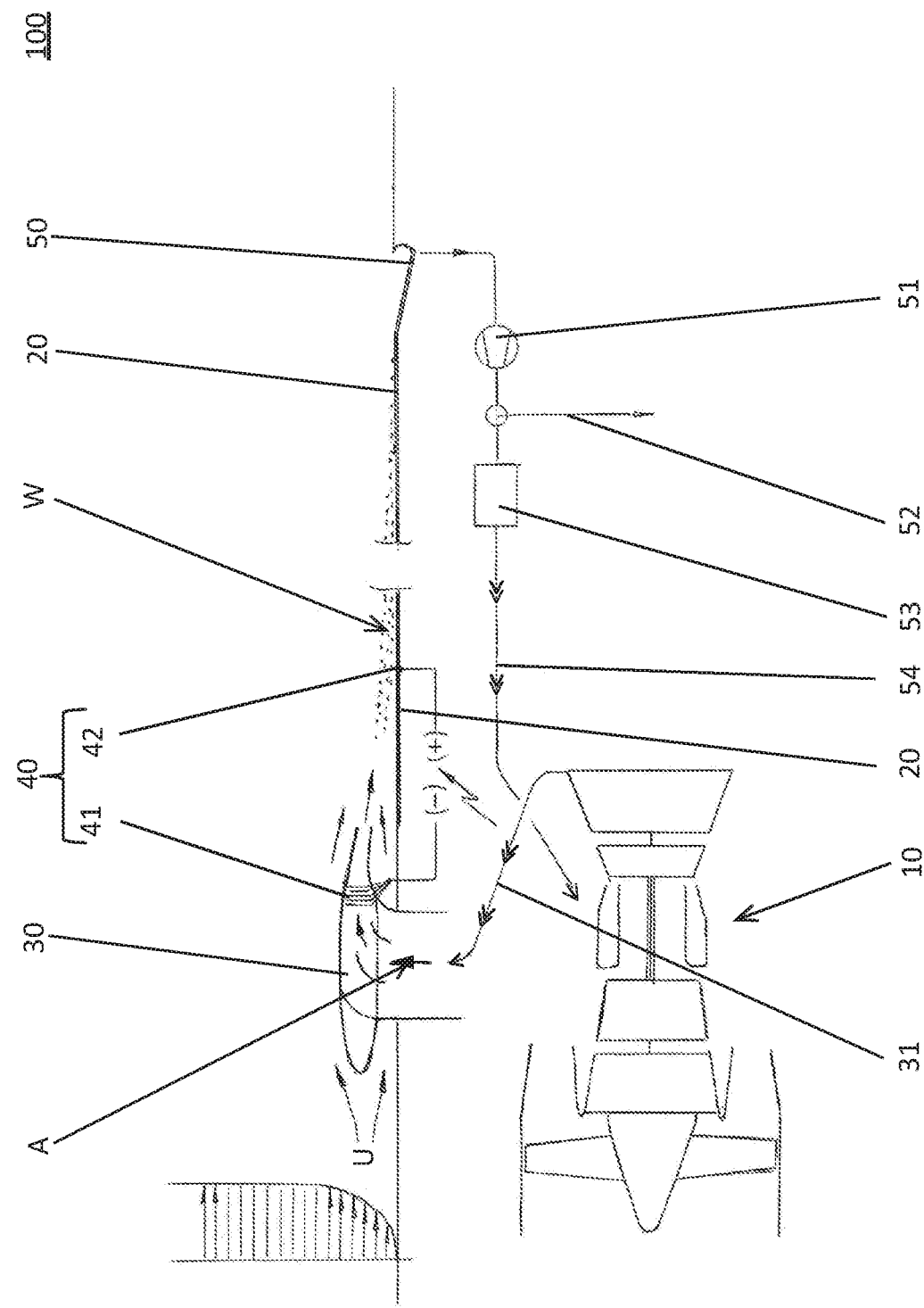
FIG. 1 shows a first exemplary specific embodiment of an aircraft according to the present invention.

FIG. 1 schematically shows a first exemplary embodiment of an aircraft 100 according to the present invention. The aircraft, which is suited, in particular for implementing a method according to the present invention, encompasses a heat engine 10 for propelling aircraft 100 as well as a conduit system 31 schematically illustrated in the figure that is adapted for conducting exhaust gas A from the heat engine to a nozzle 30.

In the illustrated operation of the aircraft (in the region of a boundary layer), nozzle 30 is at least partially circumflowed by ambient air U and is adapted for discharging exhaust gas A led therethrough in the direction of flow of ambient air U on a surface 20 over which the ambient air flows (thus, along which the ambient air flows). Thus, exhaust gas A and the respective portion of ambient air U mix at surface 20. The resulting gas mixture then continues to flow along surface 20.

The inventive mixing of exhaust gas A with ambient air U allows moisture contained in the exhaust gas to be efficiently cooled to below the dew point, without the aircraft having to be equipped therefor with heavy and bulky special devices, such as heat exchangers (which are effective in the current field of application). The cooling causes a greater drop in the saturated vapor pressure in the gas mixture than in the partial pressure of the water; supersaturation occurs, and fine water droplets W form on what are commonly known as condensation nuclei (for example, on dust particles and/or soot particles and/or on electrically charged molecules).

Furthermore, aircraft 100 has a separator device 40, which, in the present case, includes a spray electrode 41 for charging the water molecules in accordance with the corona charging method (impact ionization) and a precipitation electrode 42, which extends along surface 20 as a result of an applied pole that is complementary to the spray electrode. The electrostatic forces cause water droplets W to move in the direction of the surface, where, further downstream, they contact surface 20 and then, for example, are passed into a collecting channel 50.

Alternatively or additionally, the separator device of an aircraft according to the present invention could include a device for centrifugally separating and/or for centrifuging out at least a portion of the condensed-out water (not shown).

In addition, the illustrated example of an aircraft 100 according to the present invention has a condensate pump 51 which is adapted for drawing off the thus separated water from collecting channel 50. The water may then be allowed to drain overboard directly via a discharge conduit 52, and/or at least a portion of the water may be fed to a water treatment 53 and, subsequently thereto—through a channel system 54 (schematically illustrated in the FIG.)—to heat engine 10. There, the water may be directly injected into the combustion chamber of the heat engine, for example, or fed to a steam generator which uses the exhaust gas heat of the heat engine to generate steam.

Figure 2:
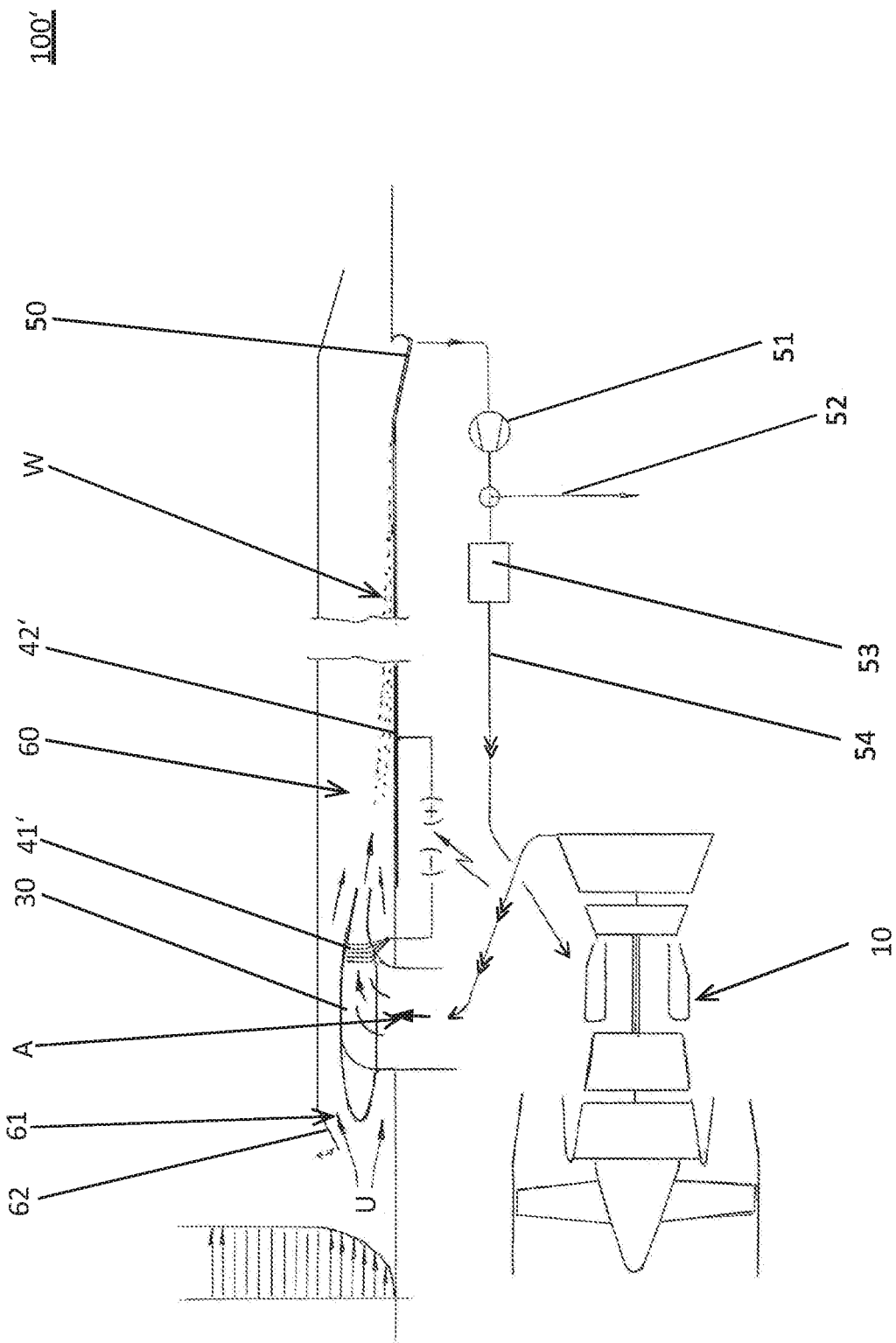
FIG. 2 shows a second exemplary specific embodiment of an aircraft according to the present invention.

FIG. 2 schematically shows an aircraft 100' in accordance with an alternative specific embodiment of the present invention. In contrast to aircraft 100 shown in FIG. 1, nozzle 30 of aircraft 100' is located inside a mixing channel 60. The ambient air, which partially flows over the aircraft (namely upstream from the nozzle) (preferably from a boundary layer), flows through channel 60 and is thereby mixed with exhaust gas A.

An inlet opening 61 of the mixing channel may be varied by a flap 62 (and preferably by an associated actuation and control unit that is not shown), so that an inflow of ambient air U into mixing channel 60 is variable, for example, as a function of a respective current output power of the heat engine and/or of a temperature of ambient air U.

Similar to the example shown in FIG. 1, nozzle 30 of aircraft 100' also has a spray electrode 41' for electrostatically charging water molecules in the exhaust gas. In the present exemplary embodiment, an associated precipitation electrode 42' of aircraft 100' is formed as part of a channel wall of mixing channel 60, toward which water droplets W are directed in response to the electrostatic forces. Analogously to the case illustrated in FIG. 1, the thus separated water is collected and removed.

A method is described for reducing contrails during operation of an aircraft 100, 100' having a heat engine 10. The method includes inducing a condensation of moisture contained in exhaust gas A of the heat engine by mixing at least a portion of the exhaust gas with ambient air U of the aircraft as well as separating the condensed-out water on the aircraft.

Also described is an aircraft 100, 100' having a heat engine 10. The aircraft includes at least one nozzle 30 which is adapted for conducting exhaust gas A from the heat engine of the aircraft at least partially into ambient air U of the aircraft and thus to produce a gas mixture, and includes at least one separator device 40 for separating condensed-out water from the gas mixture.

LIST OF REFERENCE NUMERALS

10 heat engine
20 surface of the aircraft
30 nozzle
31 conduit system
40 separator device
41, 41' spray electrode
42, 42' precipitation electrode
50 collecting channel
51 condensate pump
52 discharge conduit
53 water treatment
54 channel system
60 mixing channel
61 variable inlet opening
62 adjustable flap
100, 100' aircraft
A exhaust gas
U ambient air
W condensed-out water droplets

What is claimed is:

1. A method for reducing contrails during operation of an aircraft having a heat engine, the method comprising:
    inducing a condensation of moisture contained in the exhaust gas of the heat engine by mixing a proportion of the exhaust gas with a proportion of ambient air flowing around the aircraft during operation to create condensed-out water;
    separating the condensed-out water on the aircraft; and
    injecting the water resulting from the separating step into a combustion chamber of the heat engine or using the water resulting from the separating step to generate steam; wherein the separating includes electrostatic charging of water molecules in the exhaust gas and directing charged, condensed-out water droplets towards a complementary pole.

2. The method as recited in claim 1 wherein the mixing is at least partially performed on an outer surface of the aircraft, at least a portion of the ambient air flowing along the outer surface.

3. The method as recited in claim 1 further comprising drawing off separated water using a condensate pump.

4. The method as recited in claim 1 wherein the mixing takes place at least partially in a mixing channel in the aircraft, at least a portion of the ambient air flowing through the mixing channel.

5. The method as recited in claim 4 further comprising adjusting an inflow of ambient air into the mixing channel by influencing a variable inlet opening of the mixing channel.

6. An aircraft comprising:
    a heat engine;
    at least one nozzle having an exit facing a rear of the aircraft and adapted for conducting exhaust gas from the heat engine at least partially into ambient air flowing around the nozzle during operation of the aircraft to produce a gas mixture;
    at least one separator for separating condensed-out water from the gas mixture; and
    at least one of a collecting channel for separated water or a condensate pump for drawing off separated water.

7. The aircraft as recited in claim 6 wherein the at least one nozzle is adapted for discharging exhaust gas led therethrough
    on an outer surface of the aircraft over which at least a portion of the ambient air flows during operation of the aircraft, or
    into a mixing channel through which at least a portion of the ambient air flows during operation of the aircraft.

8. The aircraft as recited in claim 6 wherein the at least one separator includes a first pole for electrostatically charging water molecules in the exhaust gas and a second, complementary pole for attracting charged, condensed-out water.

9. An aircraft comprising:
    a heat engine;

at least one nozzle having an exit facing a rear of the aircraft and adapted for conducting exhaust gas from the heat engine at least partially into ambient air flowing around the nozzle during operation of the aircraft to produce a gas mixture;

at least one separator for separating condensed-out water from the gas mixture;

wherein the at least one nozzle is adapted for discharging exhaust gas led therethrough on an outer surface of the aircraft over which at least a portion of the ambient air flows during operation of the aircraft, or into a mixing channel through which at least a portion of the ambient air flows during operation of the aircraft.

* * * * *